(No Model.)  3 Sheets—Sheet 1.

F. A. WESSEL & E. EGGER.
FLEXIBLE GEAR FOR ELECTRIC CAR TRUCKS.

No. 531,351. Patented Dec. 25, 1894.

Witnesses:

S. L. Wood
Leocadia M. Lennan

Inventors:
Ernst Egger
Ferdinand A. Wessel
By their Attorney
Edward P. Thompson (No Model.) 3 Sheets—Sheet 2.

F. A. WESSEL & E. EGGER.
FLEXIBLE GEAR FOR ELECTRIC CAR TRUCKS.

No. 531,351. Patented Dec. 25, 1894.

Witnesses:

Inventors:
Ernst Egger
Ferdinand A. Wessel.
By their Attorney
Edward P. Thompson (No Model.) 3 Sheets—Sheet 3.
F. A. WESSEL & E. EGGER.
FLEXIBLE GEAR FOR ELECTRIC CAR TRUCKS.
No. 531,351. Patented Dec. 25, 1894.
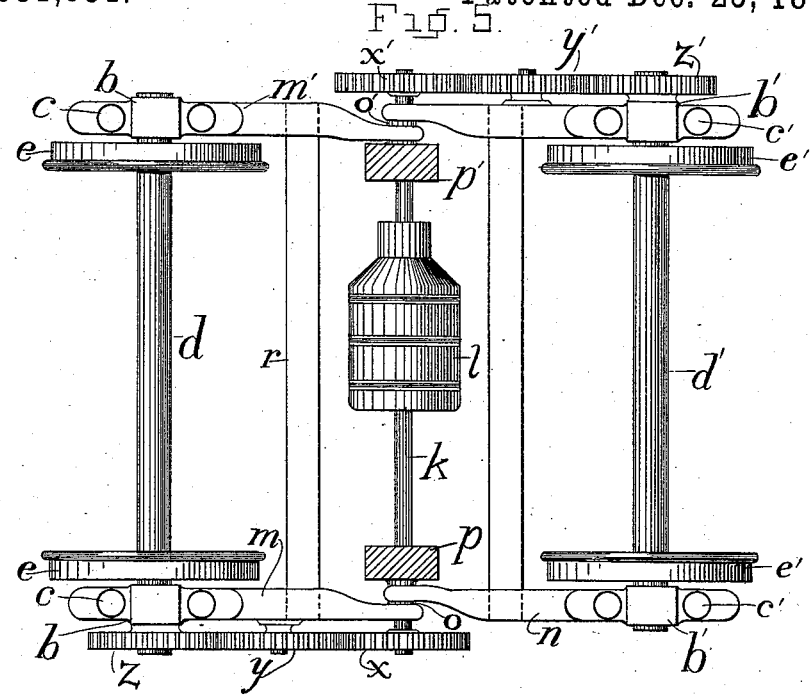
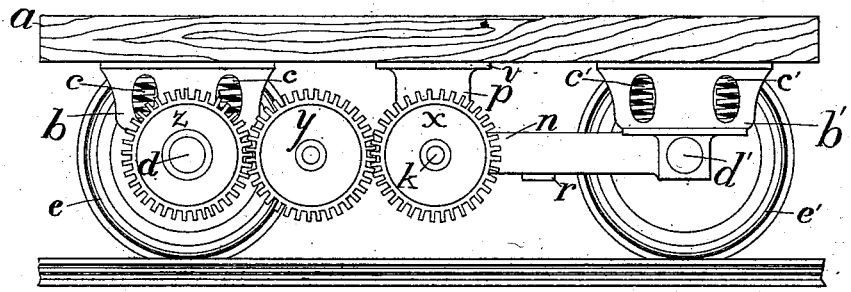
Witnesses:
Inventors:
Ernst Egger
Ferdinand A. Wessel,
By their Attorney,
Edward P. Thompson

UNITED STATES PATENT OFFICE.

FERDINAND A. WESSEL AND ERNST EGGER, OF NEW YORK, N. Y., ASSIGNORS OF ONE-FOURTH TO AARON NAUMBURG, OF SAME PLACE.

FLEXIBLE GEAR FOR ELECTRIC-CAR TRUCKS.

SPECIFICATION forming part of Letters Patent No. 531,351, dated December 25, 1894.

Application filed September 22, 1893. Serial No. 486,187. (No model.)

*To all whom it may concern:*

Be it known that we, FERDINAND A. WESSEL, a citizen of the United States, and ERNST EGGER, a subject of the Emperor of Austria-Hungary, residing at New York, in the county and State of New York, have invented certain new and useful Improvements in Flexible Gears for Electric-Street-Car Trucks, (Case No. 5,) of which the following is a specification.

Our invention relates to improvements in the gearing of electric cars, and has for its object to provide means whereby a flexible connection is produced between the motor and the car wheel and the jarring of the axle is not transmitted to the motor.

The details of the invention are set forth in the accompanying drawings, in which—

Figure 1:
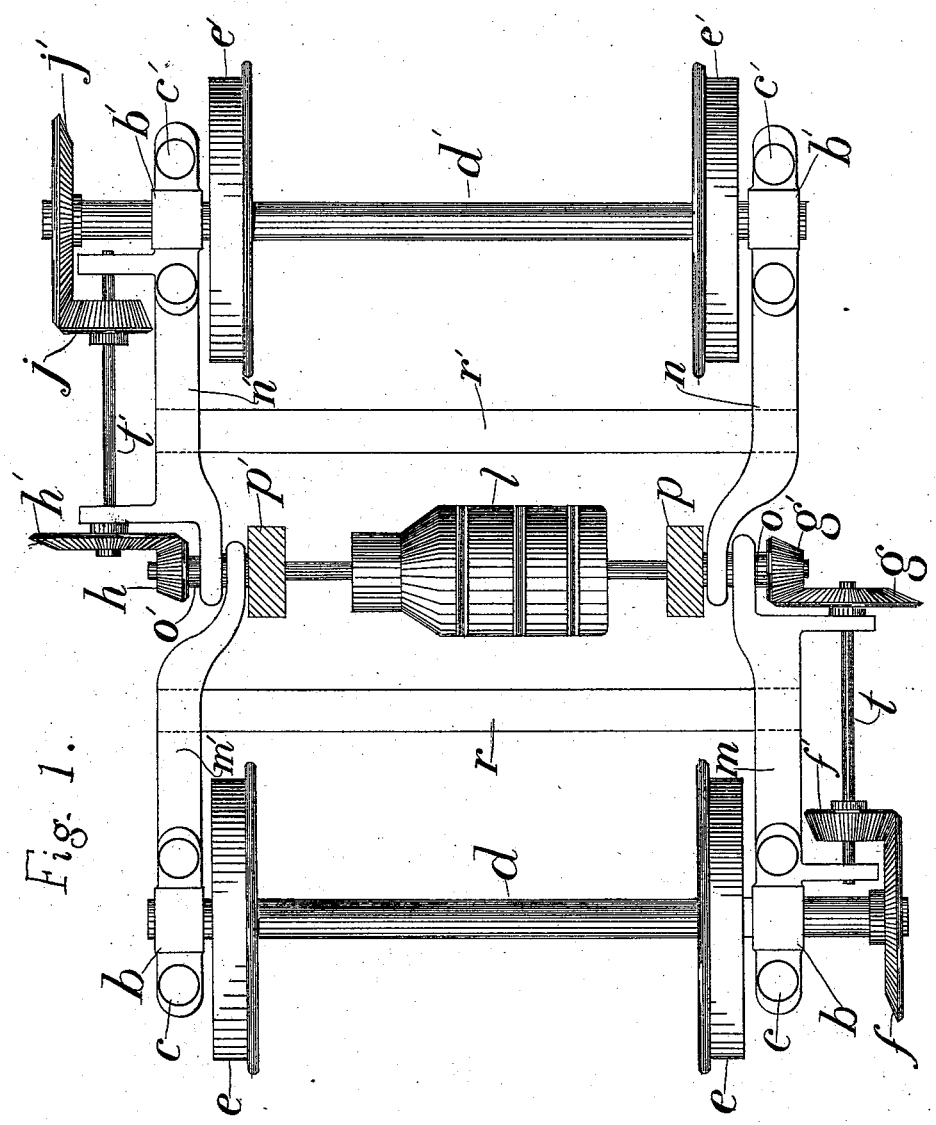
Figure 3:
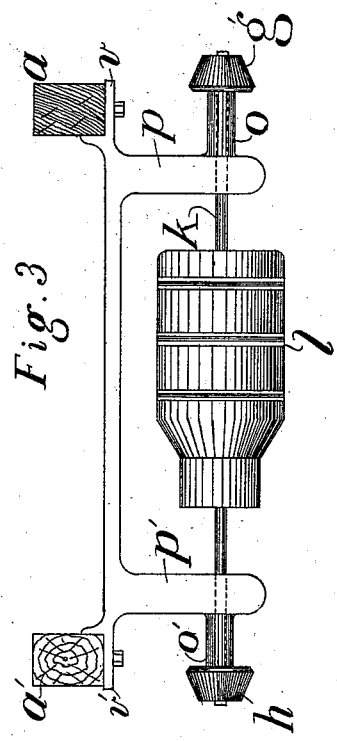
Figure 2:
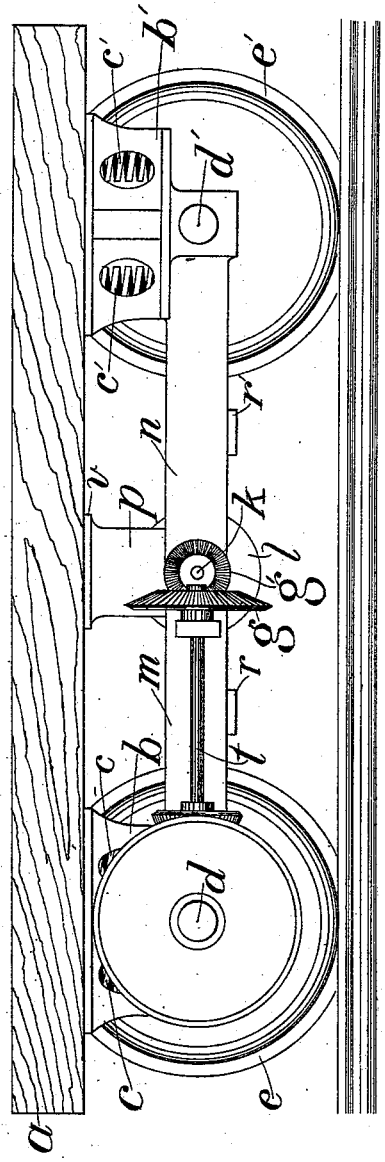
Figure 4:

Figure 1. is a plan of the car truck taken immediately below the bearers, which support the body of the car. Fig. 2. is an elevation of the car truck showing the bearers on which the car body rests. Fig. 3. is a cross section of the truck showing the armature of the driving motor and other parts in elevation. Fig. 4. is an elevation of the swinging lever to be presently mentioned. Fig. 5. is a plan of a truck showing a modification. Fig. 6. is an elevation of the same.

The device constituting our invention consists in the combination of a car body, beams $a$, for supporting the same; boxes $b, b'$, upon which the supports or cushion springs $c, c'$, rest and which are the journals for the axles $d, d'$, of the car wheels $e, e'$, bevel gear wheels $f, f', g, g', h, h', j, j'$, by means of which motion is transmitted to the car wheel axles, from the shaft $k$, which may be the shaft carrying the armature $l$, as shown, or it may be any other shaft indirectly driven by the motor; a frame composed of swinging levers $m, m', n, n'$, attached at one end to the boxes $b, b'$, of the axles, and pivoted at the other end on bearings, $o, o'$, formed in connection with the truck frame posts $p, p'$, and flexible ties $r, r'$, connecting the levers.

Reference to Fig. 4. shows more clearly the form of the swinging lever, the bearing at $d$, being for the axle, while that at $o$ is for the bearing formed upon the truck frame post. In the same figure are shown the projections $s, s'$, formed upon the swinging lever in which the shafts $t, t'$, of the gear wheels $f, f', g, g', h, h', j, j'$, have their bearings.

Fig. 3. shows more clearly the relative position of the truck frame posts $p, p'$, and the bearings $o, o'$, formed upon them. The posts are connected by a frame $u$, which is also carried outward to form shoulders or brackets $v, v'$, in which the beams $a, a'$, are bolted as shown.

In the modification shown in Figs. 5 and 6 the construction is similar, and the same letters denote similar parts; the point of difference being the substitution of the spur wheels $x, y, z$, for the bevel gear wheels. A certain amount of flexibility is thus secured—that is to say, the truck will, in operation, adapt itself to small inequalities in the track, without producing any undesirable shocks or jars among the different members of the frame; for, the swinging levers will turn about the bearings on the posts, and thus allow the car wheel to rise or fall a small amount as the case may be, without disturbing the efficiency of the transmitting mechanism, and, on account of the form of the connection, without producing any undue strains in the mechanism, tending to break the teeth out of the gear wheels.

We claim as our invention—

1. In an electric car, the combination with the truck and car axles, of a motor having a shaft a pair of levers rotary around both the shaft and the axles, gear wheels upon each end of the shaft, a gear wheel upon one end of each axle, but upon opposite sides of the car, and intermediate gearing between the gear wheels on the shaft and axles and said intermediate gearings supported on said levers and springs between said car and said levers.

2. In an electric car the combination with the truck and car axles, of a motor having a shaft, a pair of levers rotary around both the shaft and the axles, gear wheels upon each end of the shaft, a gear wheel upon one end of each axle, but on opposite sides of the car, intermediate gearing between the gear wheels on the shaft and axles, said intermediate gearings supported on said levers, flexible ties connecting those levers which are connected to the same axle and supports between said car and said levers.

3. In an electric street car truck, the combination of a car body and frame, said frame consisting of a system of cross ties and swinging levers suitably pivoted and hung on bearings formed upon posts rigidly connected to the frame, said levers being provided with projections in which bearings are formed, such bearings being arranged so as to permit of the rotation of a shaft whose axis is in the same plane with the axes of the axles of the car wheels, but in a direction perpendicular to them.

4. In an electric street car truck, the combination of a car body, a frame consisting of cross ties and levers hung upon bearings and provided with projections in which said bearings are formed, of a motor, of a system of gear wheels mounted upon shafts, one shaft being the armature shaft, or a shaft, driven directly by the motor and the other axle of the car wheels, the power being transmitted from one shaft to the other by means of gear wheels mounted upon a shaft rotating in the bearings formed in the projections upon the said swinging levers.

5. In an electric street car truck, the combination of a car body, a frame consisting of cross ties and levers, a motor, bevel gear wheels mounted on the armature shaft and on the car-wheel axles, and intermediate bevel gear wheels engaging with the same and having their bearings rigidly fixed on said levers.

6. In an electric street car, the combination with the truck and car axles, of a motor having a shaft, a pair of levers rotary around each axle and around the said shaft and connecting the same, bevel gear wheels at the ends of the armature shaft and upon the axles, and intermediate shafts having bevel gear wheels which engage with the first named gear wheels, and have their bearings rigidly fixed on said levers.

In testimony that we claim the foregoing as our invention we have signed our names, in presence of two witnesses, this 15th day of September, 1893.

FERDINAND A. WESSEL.
ERNST EGGER.

Witnesses:
EDWARD P. THOMPSON,
WILLIAM A. COURSEN, Jr.